(12) United States Patent
Seo et al.

(10) Patent No.: US 8,725,082 B2
(45) Date of Patent: May 13, 2014

(54) DONGLE AND METHOD FOR OPERATING EXTERNAL INPUT MEANS, AND EXTERNAL INPUT SYSTEM WITH THE DONGLE

(75) Inventors: Suck Ho Seo, Gyeonggi-do (KR); Jae Hwan Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 120 days.

(21) Appl. No.: 13/330,001

(22) Filed: Dec. 19, 2011

(65) Prior Publication Data

US 2012/0156993 A1    Jun. 21, 2012

(30) Foreign Application Priority Data

Dec. 20, 2010   (KR) .......................... 10-2010-0130740

(51) Int. Cl.
*H04B 7/00* (2006.01)
(52) U.S. Cl.
USPC ........................................ 455/66.1; 455/41.2
(58) Field of Classification Search
USPC ............................ 455/66.1, 41.2, 41.3, 90.3
See application file for complete search history.

(56) References Cited

U.S. PATENT DOCUMENTS

| | | | |
|---|---|---|---|
| 6,941,114 B1 * | 9/2005 | Kuo et al. .................... | 455/74 |
| 7,660,611 B1 * | 2/2010 | Asbury et al. ................ | 455/574 |
| 2004/0122649 A1 * | 6/2004 | Bartek et al. ................. | 703/23 |
| 2004/0198429 A1 | 10/2004 | Yen et al. | |
| 2006/0020723 A1 * | 1/2006 | Chia-Chun ................... | 710/62 |

FOREIGN PATENT DOCUMENTS

| | | |
|---|---|---|
| JP | 2008-046970 | 2/2008 |
| KR | 200306184 | 4/2003 |

* cited by examiner

*Primary Examiner* — Lewis West
(74) *Attorney, Agent, or Firm* — The Farrell Law Firm, P.C.

(57) ABSTRACT

A dongle and method for operating external input means, and an external input system with the dongle are provided. The dongle includes a wired interface for connecting the dongle to an external input means, the external input means including at least one external input device; a signal converter for converting a wired signal, which is transmitted from at least one external input device connected to the wired interface, into a Radio Frequency (RF) signal; and an RF communication module for transmitting the RF signal to an electronic device via an RF communication channel.

17 Claims, 9 Drawing Sheets

<801>

<803>

DONGLE AND METHOD FOR OPERATING EXTERNAL INPUT MEANS, AND EXTERNAL INPUT SYSTEM WITH THE DONGLE

PRIORITY

This application claims priority under 35 U.S.C. §119(a) to Korean Patent Application No. 10-2010-0130740, which was filed in the Korean Intellectual Property Office on Dec. 20, 2010, the entire content of which is incorporated herein by reference.

BACKGROUND OF THE INVENTION

1. Field of the Invention

The present invention relates generally, to an external input system and method thereof, and more particularly, to a dongle that supports external input means that users are familiar with that can easily be applied to various types of electronic devices, a method for operating external input means, and an external input system that includes the dongle.

2. Description of the Related Art

A dongle is piece of hardware that attaches to a computer. Some types of dongles may include a portable USB flash drive. The term "dongle" was previously used to refer to devices used for the authentication of computer software. However, the term "dongle" currently refers to various small pieces of hardware that attach to an electronic device and support a particular function of the device.

A dongle may include a number of components, such as a communication modem for supporting wireless communication, memory for storing data, and a central processing unit for controlling the built-in communication modem, the access to memory, and the use of memory. A dongle may receive electric power supplied from a host to which the dongle plugs into, instead of receiving power supplied from a battery installed in the dongle. In order to plug into a host, a dongle includes an interface, such as a standard Universal Serial Bus (USB) connector.

Conventional dongles are disadvantageous in that they are merely applied to electronic devices with a standard USB connector. In addition, since dongles only support a particular communication function as a secondary function, various functions of dongles must be developed in order to provide user convenience.

SUMMARY OF THE INVENTION

The invention has been made in view of the above problems, and an aspect of the present invention is to provide a dongle that can support external input means that users are familiar with that can easily be applied to various types of electronic devices; a method for operating an external input means; and an external input system with the dongle.

Another aspect of the present invention is to provide a dongle that can operate an external input means, and thus allows the user to easily operate the external input means; a method for operating an external input means; and an external input system with the dongle.

In accordance with an aspect of the present invention, a dongle for operating an external input means is provided. The dongle includes a wired interface for connecting the dongle to an external input means, the external input means including at least one external input device; a signal converter for converting a wired signal, which is transmitted from at least one external input device connected to the wired interface, into a Radio Frequency (RF) signal; and an RF communication module for transmitting the RF signal to an electronic device via an RF communication channel.

In accordance with another aspect of the present invention, an external input system is provided. The external input system includes an external input means, the external input means including at least one of a keyboard and a mouse device; a dongle for converting a Universal Serial Bus (USB) wired signal, the wired signal being created via the external input means, into a Bluetooth signal, and for transmitting the converted via the Bluetooth module, the dongle including at least one USB interface connected to the external input means; and an electronic device for establishing a Bluetooth communication channel with the dongle and performing a function corresponding to the received BT signal.

In accordance with another aspect of the present invention, a method for operating an external input means is provided. The method includes establishing a wired connection between a dongle and the external input means; establishing a wireless connection between the dongle and an electronic device; transferring, by the wired connection, a wired signal created via the external input means, from the external input means to the dongle; converting, by the dongle, the wired signal to a Radio Frequency (RF) signal; wirelessly transmitting the RF signal from the dongle to the electronic device; and performing, by the electronic device, a function corresponding to the transmitted RF signal.

BRIEF DESCRIPTION OF THE DRAWINGS

The features and advantages of the invention will become more apparent from the following detailed description in conjunction with the accompanying drawings, in which.

DETAILED DESCRIPTION OF EMBODIMENTS OF THE PRESENT INVENTION

Figure 1:
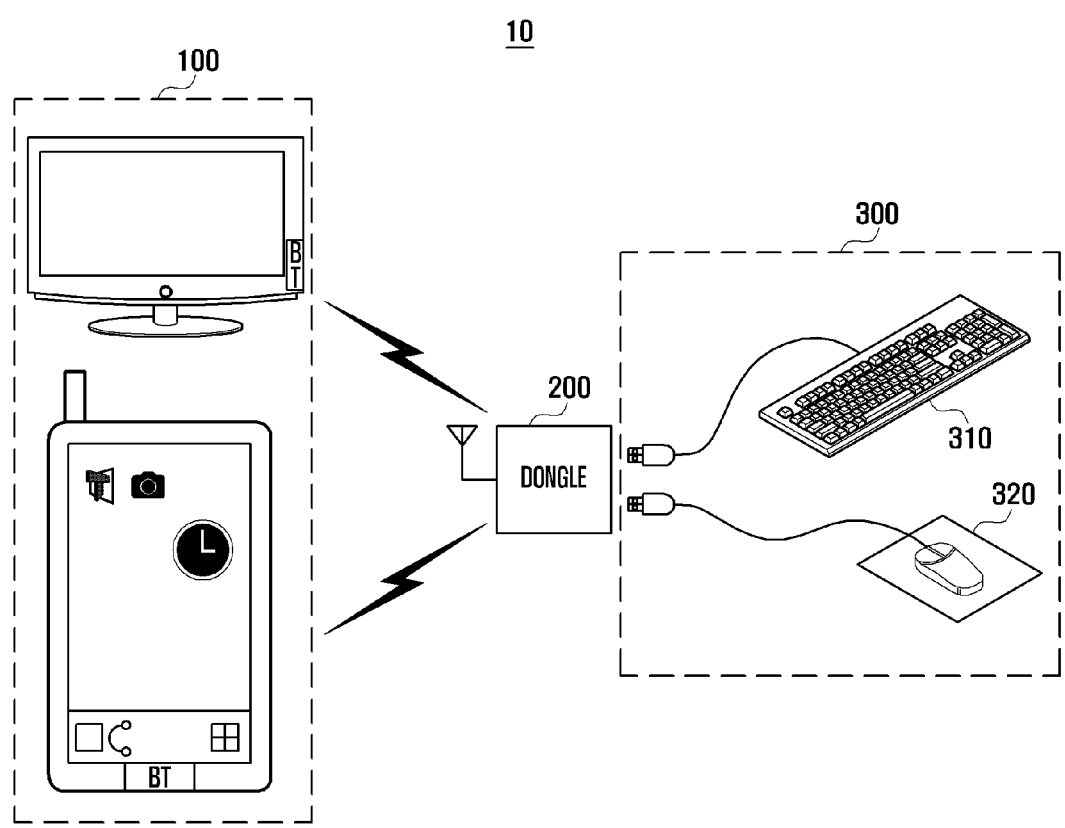
FIG. 1 is a schematic diagram illustrating an external input system to which a dongle for operating an external input means is applied, according to an embodiment of the present invention.

Hereinafter, embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

The terms or words described in the present description and the claims are not merely limited to general or dictionary definitions, but instead are defined in accordance with the following description. The embodiments of the present invention described herein and configurations illustrated in the drawings merely correspond to examples of embodiments of the present invention, and accordingly, there may be various modifications, alterations, and equivalents thereof in accordance with embodiments of the present invention.

In the following description, a dongle and method for operating an external input means, and an external input system operated with the dongle will be described. The dongle is connected to an external input means via a wired communication interface. The dongle is connected to an electronic device via a wireless communication interface. In the following examples according to embodiments of the present invention, it is assumed that a wired communication interface is implemented with a Universal Serial Bus (USB) interface and a wireless communication interface is implemented with a Bluetooth (BT) interface. Herein, the term "Bluetooth" refers to devices and/or communications compliant with a BLUE-TOOTH® specification. It should be, however, understood that the invention is not limited to the USB interface and Bluetooth interface. The wired and wireless communication interfaces may be implemented through various other types of interfaces in accordance with embodiments of the present invention.

FIG. 1 illustrates a schematic diagram showing an external input system to which a dongle for operating an external input means is applied, according to an embodiment of the invention.

Referring to FIG. 1, the external input system 10 includes an electronic device 100, a dongle 200 and an external input means 300. In the following description, it is assumed that the dongle 200 includes at least one wired interface (e.g., at least one USB interface) and that the external input means 300 includes at least one external input device with a USB connector for connecting to the USB interface. However, it should be understood that embodiments of the present invention are not limited to USB interfaces and connectors. For example, the USB interfaces and connectors may be replaced with other types of wired interfaces and connectors (e.g., a micro USB, UART mode, etc.) in accordance with embodiments of the present invention.

When the external input means 300 is connected to the dongle 200 and generates an input signal, the external input system 10 wirelessly transmits the input signal to the electronic device 100 via the dongle 200. In that case, the user can control the electronic device 100, to create a corresponding signal for managing the electronic device 100, via the external input means 300. This control operation is especially beneficial in cases where the user is more familiar with the external input means than the electronic device 100. In the following description, the components of the external input system 10 are described in detail.

The electronic device 100 is wirelessly connected to the dongle 200. The electronic device 100 receives signals from the external input means 300 via the dongle 200 and performs functions according to the received signals. The electronic device 100 includes a Radio Frequency (RF) communication module that establishes an RF communication channel with the dongle 200. According to an embodiment of the invention, the RF communication module may be implemented with a Bluetooth module. The electronic device 100 transfers signals received via the Bluetooth module to the controller, and performs user functions corresponding to the signals according to the control of the controller. More specifically, the controller converts the received signals to commands adapted to the electronic device 100, and then applies the converted commands to the electronic device 100, thereby performing the user functions. Types of the electronic device 100 may include a variety of devices such as monitors or portable terminals that can process the signals transmitted from the external input means 300. In the following described embodiments of the present invention, the electronic device 100 is described as a smart phone. The configuration of the electronic device 100 is described in more detail herein with reference to FIG. 2.

The dongle 200 includes at least one wired interface for allowing the insertion of the external input means 300 (e.g., at least one USB interface) and an RF communication module for establishing an RF communication channel with the electronic device 100 and transmitting signals from the external input means 300 to the electronic device 100. The dongle 200 converts a received input signal, which is received from the external input means 300 over a wired connection (e.g., a USB signal), into a signal adapted to the RF communication module (e.g., a Bluetooth signal adapted to a Bluetooth module), and then wirelessly transmits the adapted signal to the electronic device 100. The detailed configuration, functions, and operations of the dongle 200 are described in further detail herein.

The external input means 300, which is wiredly connected to the dongle 200, creates a signal according to a user's operation and outputs the created signal to the dongle 200. According to an embodiment of the present invention, the external input means 300 includes at least one external input device (e.g., a keyboard 310 and/or a mouse device 320). However, the external input means 300 is not limited to the keyboard 310 or the mouse 320, but may include other types of input devices that can transmit a user's input signals to the electronic device 100. As shown in FIG. 1, the keyboard 310 and mouse device 320 each include connectors for connecting to the dongle 200, so that they can be inserted into the wire interfaces (e.g., USB interfaces) of the dongle 200. The keyboard 310 and mouse device 320 create unique input signals, respectively, for example, key input signals of the keyboard 310 and direction or click signals of the mouse device 320, and then transfer them to the dongle 200.

As described above, the external input system 10 allows the user to easily handle portable terminals having an input unit that the user is not familiar with and/or provide input to electronic devices without a user input unit, by providing input signals to such devices via the external input means 300 that the user may be relatively more familiar with (e.g., a keyboard 310 and/or a mouse device 320) and via the dongle 200. The external input system 10 also provides an interface that supports the wireless signal transmission between the dongle 200 and the electronic device 100. Therefore, although the electronic device 100 may be distanced from the user and/or the external input means 300, the user can still create and transmit signals from the external input means 300 to the electronic device 100 via the dongle 200.

Figure 2:
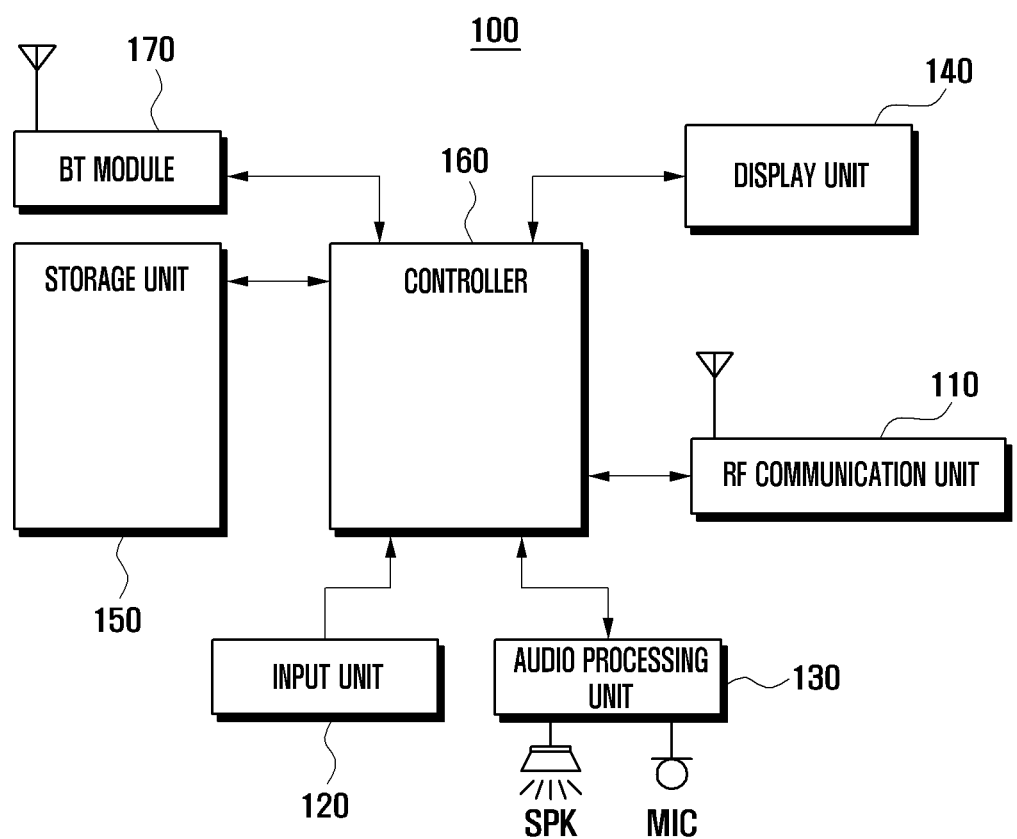
FIG. 2 is a schematic block diagram illustrating an electronic device according to an embodiment of the present invention.

FIG. 2 is a schematic block diagram illustrating an electronic device 100 according to an embodiment of the invention.

Referring to FIG. 2, the electronic device 100 includes an RF communication unit 110, an input unit 120, an audio processing unit 130, a display unit 140, a storage unit 150, an RF communication module 170, and a controller 160. In the present example, the RF communication module is implemented with a Bluetooth (BT) module, but other communication modules using other wireless communication schemes may be used in accordance with embodiments of the present invention.

The electronic device 100 enables the BT module 170 to establish a short-range RF communication channel with the dongle 200. The electronic device 100 converts signals transmitted from the dongle 200 into corresponding signals, and then performs the user functions according to the corresponding signals. The electronic device 100 can also perform the user functions according to the signals transmitted from the external input means 300, either independently from or in conjunction with the signals created via the input unit 120 of the electronic device 100.

The RF communication unit 110 establishes, between mobile communication systems, communication channels for performing voice/video calls, data communication, etc., under the control of the controller 160. To this end, the RF communication unit 110 includes an RF transmitter for up-converting the frequency of signals to be transmitted and amplifying the signals and an RF receiver for low-noise amplifying received RF signals and down-converting the frequency of the received RF signals. According to an embodiment of the invention, the RF communication unit 110 operates according to the signal received via the BT module 170, including operations such as establishing an RF communication channel with a base station, so that the electronic device 100 can provide various communication services via the established communication channel. For example, when the BT module 170 receives signals for writing and transmitting a message, the RF communication unit 110 transmits the message to a base station. When the BT module 170 receives a signal for connecting to a web server, the RF communication unit 110 transmits an access signal for connecting to the web server via a base station or an access point or receives a corresponding signal therefrom, and then establishes a data communication channel therewith. According to alternative embodiments of the present invention, the electronic device 100 may be implemented without the RF communication unit 110, in cases such as when the electronic device 100 does not support a communication function.

The input unit 120 includes input keys and function keys that allow the user to input numbers or letter information and to set a variety of functions. The function keys may include direction keys, side keys, shortcut keys, etc., which are set to perform specific functions. The input unit 120 directly creates signals for operating the electronic device 100. When a communication channel is established between the dongle 200 and the electronic device 100 so that the user can operate the electronic device 100 via the external input means 300, the input unit 120 may be disabled. Alternatively, the input unit 120 can create signals according to a user's control irrespective of signals transmitted from the external input means 300, and can then transfer the signals to the controller 160. The user can create a signal for establishing a short-range communication channel with the dongle 200 or for disconnecting the electronic device 100 from the dongle 200. According to another embodiment of the present invention, the electronic device 100 may be implemented without the input unit 120.

The audio processing unit 130 includes a SPeaKer (SPK) and a MICrophone (MIC). The speaker outputs audio data that is transmitted/received during the call, included in messages, or stored in the storage unit 150. The microphone receives a user's voice during the call or other audio signals. According to an embodiment of the present invention, the audio processing unit 130 can output, according to a user's settings, audio data input when the electronic device 100 is connected to the dongle 200, audio data transmitted from the external input means 300 and sound effects when the electronic device 100 receives signals from the external input means 300. The output of sound effects or audio data may be set to perform in a silent mode, according to a user's settings.

The display unit 140 may display menus, user's input information, and/or information provided to the user. The display unit 140 displays various types of screens, such as an idle screen, a menu screen, a message writing screen, a call screen, a game screen, a music playback screen, etc. The display unit 140 may be implemented with a Liquid Crystal Display (LCD), an Organic Light Emitting Diode (OLED), etc. In particular, when the display unit 140 is manufactured as a touch screen, the display unit 140 also serves to perform an input function. To this end, the display unit 140 may include a display panel as well as touch sensors arrayed on the display panel, thereby supporting a touch screen function. According to an embodiment of the present invention, when the electronic device 100 establishes a short-range communication channel with the dongle 200 connected to the external input means 300, the display unit 140 can display screens altered according to signals transmitted from the external input means 300 via the dongle 200 or information corresponding to the signals. For example, the display unit 140 can display letter/character information input via the keyboard 310. In addition, in order to support an input function via the mouse device 320, the display unit 140 can display a mouse cursor in a certain area on the screen. The display unit 140 may display movement of the mouse cursor according to signals transmitted from the mouse device 320 and/or screens according to the click or drag operation of the mouse device 320. The display unit 140 may also display a screen corresponding to a process where the electronic device 100 establishes a communication channel with the dongle 200. The display unit 140 also displays, on a certain area on the screen, information regarding the state showing whether the communication channel is currently established with the dongle 200. In that case, the user detects the communication state between the electronic device 100 and the dongle 200 based on the connection information, and then conducts a corresponding operation within a certain distance that maintains the communication connection.

The storage unit 150 stores application programs for executing functions according to the invention. The storage unit 150 also stores application programs for reproducing various types of files. In addition, when the electronic device 100 is equipped with a touch screen, the storage unit 150 stores a key map and a menu map to operate the touch screen. The key map and menu map can be implemented in various modes. For example, the key map may be a keyboard map, a 3×4 key map, a QWERTY key map, etc. The key map may also be a control key map for controlling an application program that is currently activated. The menu map may be a menu map for controlling an application program that is currently activated. The menu map may also be a menu map containing various types of menu items provided by the electronic device 100, etc. The storage unit 150 may include a program storage area and a data storage area.

The program storage area stores an Operating System (OS) for booting the electronic device 100 and for controlling the components therein. The program storage area also stores application programs for reproducing various types of files, for example, audio files, image files, video files, etc. In particular, the program storage area may store various application programs, including an application program for converting signals transmitted from the external input means 300 into signals adapted to the electronic device 100.

The signal converting application program converts instructions transmitted from the external input means 300 into codes that can be processed in the electronic device 100. To this end, the signal converting application program includes a number of program routines: for example, for analyzing instructions transmitted from the external input means 300, for mapping the instructions to commands supported by the electronic device 100; and for outputting the mapped commands to perform corresponding functions in the electronic device 100. When the electronic device 100 is configured with hardware compatible with the instructions transmitted from the external input means 300, the electronic device 100 may operate without using the signal converting application program.

The data storage area stores data, such as various types of content generated when the electronic device 100 is used. When the display unit 140 is implemented with a touch screen, the data storage area may store user data input via the touch screen. According to an embodiment of the present invention, the data storage area may also serve as a buffer that stores data transmitted from the external input means 300. For example, when the electronic device 100 performs a document writing function and the user inputs information for a document to the external input means 300, the data storage area buffers the data corresponding to the input information transmitted from the external input means 300. The data storage area stores a code matching table adapted to an electronic device that supports the signal converting application program. The code matching table includes values that are used to convert signals transmitted from the external input means 300 into commands that will be applied to the electronic device 100. When the electronic device 100 is designed in such a way that the command signals are compatible with the signals transmitted from the external input means 300, the data storage area may not need the code matching table.

The BT module 170 is a short-range communication module that establishes a short-range communication channel with a short-range communication module included in the dongle 200. The electronic device 100 may transmit signals of the BT module 170 to the dongle or receive signals from the dongle 200, via the antenna of the RF communication unit 110. Alternatively, the electronic device 100 may include an additional antenna for the BT module 170. The BT module 170 performs Bluetooth communication that is based on a short-range Radio Frequency (RF) standard for short-range communication, including one-to-multi communication, voice signal and data transmission, and transmission through certain solid matters (which may or may not include certain solid metals according to various conditions). The BT module 170 may allow for communication between electronic devices within a range up to 10 m, or even up to 100 m according to the particular model of the BT module 170. The BT module 170 may perform a pairing process to establish a communication channel with the dongle 200. When the BT module 170 performs a single pairing process according to the types of dongle, the BT module 170 may omit a password inputting process that may be required in an initial pairing process and establish a communication channel with the dongle.

To this end, the electronic device 100 may further include a Near Field Communication (NFC) module (not shown) for acquiring information regarding the short-range communication module included in the dongle 200. When the electronic device 100 includes an NFC module, the electronic device may control the NFC module in read mode to acquire information regarding the short-range communication module of the dongle 200, e.g., Bluetooth pairing information, omit the process of transmitting/receiving signals for performing an additional pairing process based on the acquired information, and directly detect the dongle 200 to establish a communication channel with the dongle 200. When the electronic device 100 does not include the input unit 120, the electronic device 100 can control the NFC module in tag mode and automatically establish a communication channel with the dongle 200 according to a request for establishing a short-range communication channel.

The controller 160 controls the supply of electric power to the components in the electronic device 100 and initializes the components. After completing the initialization, the controller 160 controls the signals flowing between the components in order to process signals transmitted from the external input means 300. The controller 160 activates the BT module 170 according to a signal input via the input unit 120, and scans dongles near the electronic device 100 via the BT module 170. When the controller 160 detects the dongles only through BT modules, the controller 160 performs a pairing process for establishing a communication channel with a general BT module. However, when the controller 160 detects a dongle through an NFC module, the controller 160 controls an NFC module included in the electronic device 100 to acquire information related to a Bluetooth module of the dongle from the NFC module included in the dongle, and then establishes an RF communication channel with the dongle based on the acquired information.

When the controller 160 receives an RF signal (e.g., a Bluetooth signal) transmitted from the external input means 300 via a communication channel established between the electronic device 100 and the dongle 200, the controller 160 can control the electronic device 100 according to the received RF signal. When the controller 160 detects that the signals are incompatible with the signal transmitted from the external input means 300, the controller 160 calls a signal converting application program and then controls the electronic device 100 according to the signals converted via the program.

As described above, since the electronic device 100 establishes an RF communication channel with the dongle 200 and is controlled via the signals input via the external input means 300 connected to the dongle 200, the user can easily control the electronic device 100 by using the input means that he/she is familiar with.

Figure 3:
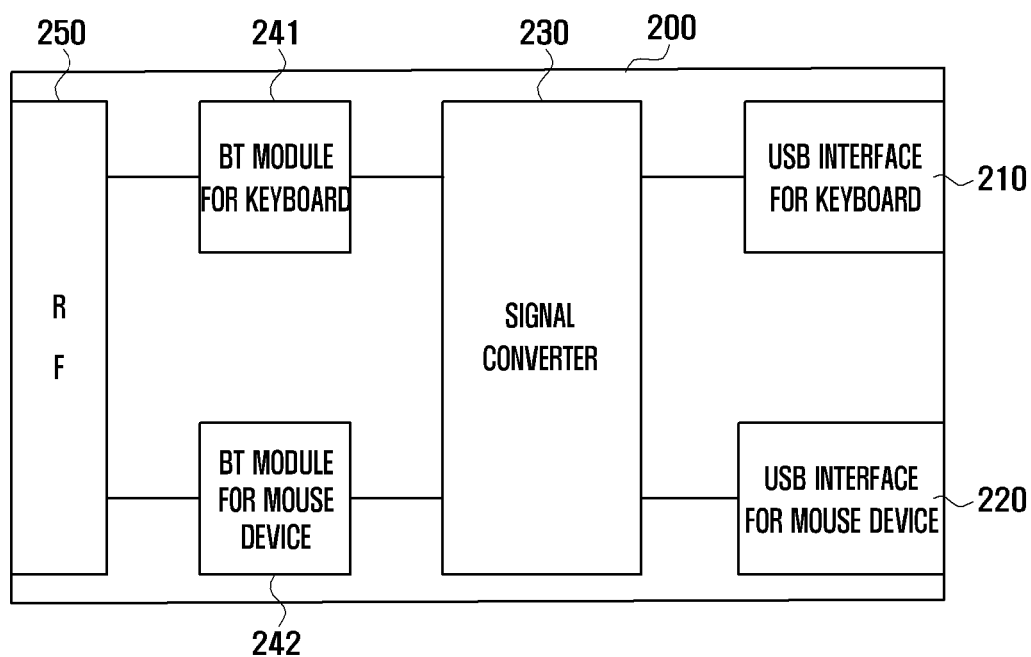
FIG. 3 is a schematic block diagram illustrating an example of a dongle according to an embodiment of the present invention.

FIG. 3 is a schematic block diagram illustrating an example of a dongle according to an embodiment of the present invention.

Referring to FIG. 3, a dongle 200 may includes a keyboard wired interface, e.g., a keyboard USB interface 210 (i.e., USB interface 210 for keyboard); a mouse device wired interface, e.g., a mouse device USB interface 220 (i.e., USB interface 220 for mouse device); a signal converter 230; a keyboard RF communication module, e.g., a keyboard BT module 241 (i.e., BT module 241 for keyboard); a mouse device RF communication module, e.g., a mouse device BT module 242 (i.e., BT module 242 for mouse device); and an antenna 250. The dongle 200 may further include a power supply for supplying electric power to the components and an external input means 300 connected thereto. The power supply may be implemented with a recharging battery or a receptacle connected to commercial electric power via an adapter, according to the dongle manufacturer's design.

As shown in FIG. 3, the dongle 200 is designed in such a way that the keyboard USB interface 210 and the mouse device USB interface 220 connect to the keyboard 310 and the mouse device 320 of the external input means 300, respectively. When the dongle 200 connects to the external input means 300 via corresponding interface, the dongle 200 supplies electric power to the external input means 300. When the dongle 200 receives a signal from the external input means 300, the dongle 200 controls the signal converter 230 to convert the signal (e.g., a USB signal) into a Bluetooth signal, and then transmits the converted signal to the electronic device 100. The components of the dongle 200 of FIG. 3 are described in detail as follows.

The keyboard USB interface 210 includes a standard USB interface that can connect to a USB connector of the keyboard 310. When the keyboard 310 includes a micro USB connector, the keyboard USB interface 210 may be configured with a port appropriate for connecting to the micro USB connector.

Similarly, the mouse device USB interface 220 may be configured to connect to a USB connector of the mouse device 320 via a standard USB connector or a micro USB connector.

Embodiments of the present invention are not limited to the above-described keyboard USB interface 210 and mouse device USB interface 220, and the dongle 200 may be modified to further include a USB interface in accordance with embodiments of the present invention. For example, the dongle 200 further includes a paint USB interface for connecting to a graphic painting device for supporting graphic work. Alternatively, the dongle 200 may be modified to include at least one of the keyboard USB interface 210 and the mouse device USB interface 220, i.e., the keyboard USB interface 210 and/or the mouse device USB interface 220.

The signal converter 230 converts a wired keyboard signal input via the keyboard 310 or a wired mouse device signal input via the mouse device 320 into a keyboard RF signal or a mouse device RF signal. To this end, the signal converter 230 includes an input buffer and a buffer handler. The input buffer temporally stores wired signals, transferred from the keyboard 310 and mouse device 320, and outputs the stored wired signals to the buffer handler. The buffer handler supports the converting of the wired signal stored in the input buffer into RF signal. For example, when the buffer handler receives a command corresponding to a particular ASCII code from the keyboard, the buffer handler converts the command to a packet in a format to be transmitted via the BT module 240. Likewise, when the buffer handler receives a signal corresponding to a movement or click operation of the mouse device or a composite signal corresponding to a movement and click operation, the buffer handler converts corresponding signals into packets to be transmitted via the BT module 240. The signal converter 230 can transfer the converted signal to a BT module 241 or 242 according to the characteristic of the signal, i.e., according to whether the signal is converted from a signal input via the keyboard 310 or mouse device 320. When the converted signal is produced from a signal input via the keyboard, the signal converter 230 converts the signal to a keyboard RF signal, i.e., a BT signal, and transfers the converted signal to the keyboard BT module 241. Likewise, when the converted signal is produced from a signal input via the mouse device, the signal converter 230 converts the signal to a mouse device RF signal, i.e., a BT signal, and transfers the converted signal to the mouse device BT module 242.

The keyboard BT module 241 and the mouse device BT module 242 establish short-range communication channels with the electronic device 100 via the antenna 250, respectively. During this process, the keyboard BT module 241 and the mouse device BT module 242 each perform pairing processes with the electronic device 100. After completing the pairing processes, the keyboard and mouse BT modules 241 and 242 can establish short-range communication channels with the electronic device 100 respectively. When the keyboard BT module 241 and the mouse device BT module 242 receive packets from the signal converter 230, these PT modules can transmit the received packets to the electronic device 100 via the antenna 250.

The antenna 250 transmits/receives signals to/from electronic device 100 to establish, with the electronic device 100, short-range communication channels for the keyboard BT module 241 and the mouse device BT module 242. The antenna 250 may be designed as a pattern and formed on a certain area of the dongle 200, e.g., on the inner side of the case.

As described above, the dongle 200 may include interfaces that are wiredly connected to the external input means 300 such as a keyboard, a mouse device, etc. The dongle 200 converts a wired signal created via a corresponding external input means into a corresponding signal, and then wirelessly transmits it to the electronic device 100. Accordingly, the above-described example of the dongle 200 allows the user to easily operate the electronic device 100 according to the wire signal that he/she inputs via the keyboard and the mouse device.

Figure 4:
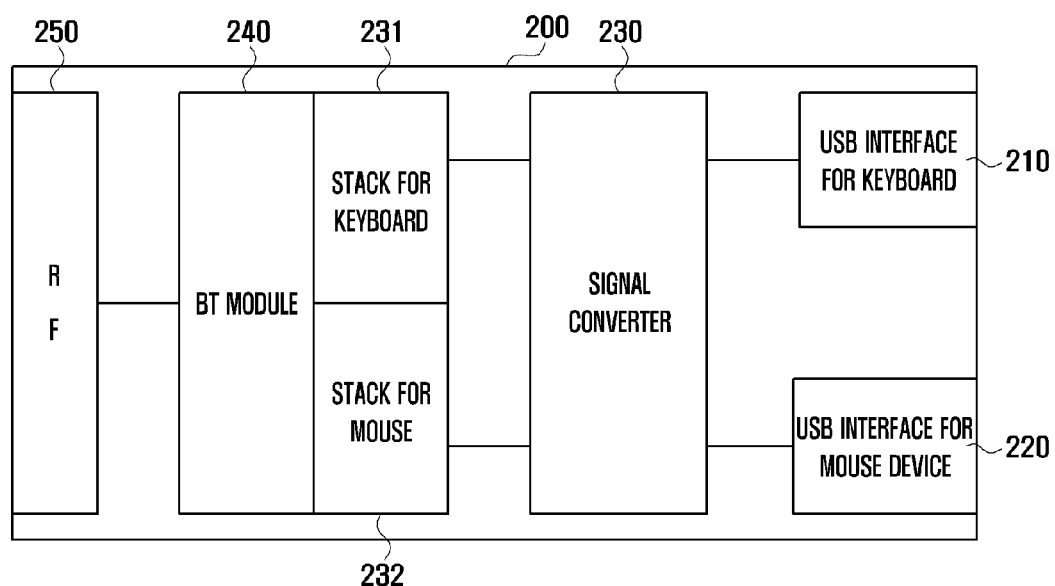
FIG. 4 is a schematic block diagram illustrating another example of a dongle according to an embodiment of the present invention.

FIG. 4 is a schematic block diagram illustrating an example of a dongle according to another embodiment of the present invention.

Referring to FIG. 4, the dongle 200 may include a keyboard USB interface 210, a mouse device USB interface 220, a signal converter 230, a keyboard stack 231 (i.e., stack 231 for keyboard), a mouse device stack 232 (i.e., stack 232 for mouse device), a BT module 240, and an antenna 250. Since the keyboard USB interface 210, the mouse device USB interface 220, and the antenna 250 of the dongle of FIG. 4 operate in a manner similar to that described above regarding the dongle of FIG. 3, a further detailed description of these elements is omitted for clarity and conciseness.

As shown in FIG. 4, the signal converter 230 converts a wired signal input via the keyboard 310 or the mouse device 320, e.g., a wired USB signal, into an RF signal (e.g., a Bluetooth signal). To this end, the signal converter 230 includes an input buffer and a buffer handler. The input buffer temporarily stores wired signals, transferred from the keyboard 310 and mouse device 320, and outputs them to the buffer handler. The buffer handler supports the converting of the wired USB signal stored in the input buffer into a BT signal. In particular, the signal converter 230 transfers the converted signal, i.e., a keyboard RF signal (or a BT signal), to the keyboard stack 231. Likewise, the signal converter 230 transfers the mouse device RF signal (or a BT signal) to the mouse device stack 232. In order to transfer the signal to the mouse device stack 232, the signal converter 230 further includes signal lines for recording information related to the keyboard stack 231 and the mouse device stack 232.

The keyboard stack 231 is connected to the signal converter 230 and stores the keyboard RF signal, which is converted as a BT signal, via the signal converter 230. The BT module 240 reads the keyboard RF signal from the keyboard stack 231. The keyboard stack 231 is implemented with a First-In-First-Out system.

The mouse device stack 232 is connected to the signal converter 230 and stores the mouse device RF signal, which is converted as a BT signal, via the signal converter 230. The BT module 240 reads the keyboard RF signal from the mouse device stack 232. The mouse device stack 232 is implemented with a First-In-First-Out system.

The BT module 240 accesses signals stored in keyboard stack 231 and the mouse device stack 232 (e.g., a keyboard RF signal or a mouse device RF signal converted as BT signal), and then transmits the accessed signals to the electronic device 100 via the antenna 250. In order to access the signals, the BT module 240 further includes signal lines for reading data from the keyboard stack 231 and the mouse device stack 232.

Figure 5:
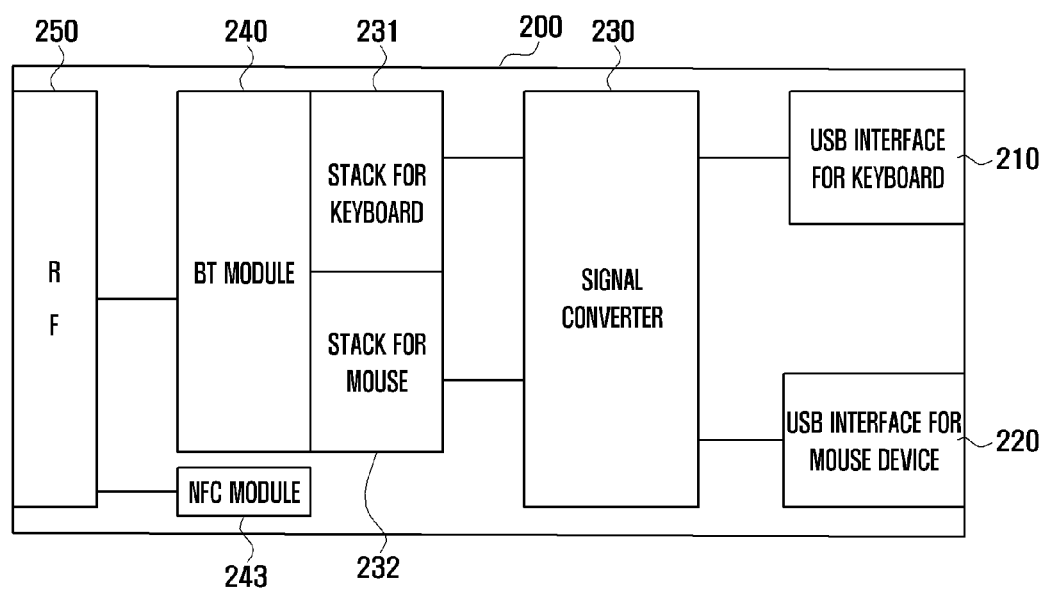
FIG. 5 is a schematic block diagram illustrating another example of a dongle according to an embodiment of the present invention.

FIG. 5 is a schematic block diagram illustrating an example of a dongle according to another embodiment of the present invention.

Referring to FIG. 5, according to another embodiment of the present invention, the dongle 200 may include a keyboard USB interface 210, a mouse device USB interface 220, a signal converter 230, a keyboard stack 231, a mouse device stack 232, a BT module 240, a NFC module 243, and an antenna 250. Since the keyboard USB interface 210, the mouse device USB interface 220, the signal converter 230, the keyboard stack 231, the mouse device stack 232, and the antenna 250, are the same as described herein with respect to the dongle 200 of FIG. 4, a further detailed description of these same elements is omitted in the following description for clarity and conciseness.

As shown in FIG. 5, the NFC module 243 performs a tagging operation when an NFC module of the electronic device 100 performs a reading operation. When the NFC module 243 receives a tagging request from the electronic device 100 via the antenna 250, the NFC module 243 transmits a reply in response to the request to the electronic device 100. When the NFC module 243 receives, from the electronic device 100, a signal for requesting BT pairing information for establishing an RF communication channel, the NFC module 243 transmits the BT pairing information to the NFC module of the electronic device 100. In a manner similar to the example of the dongle 200 described with reference to FIG. 4, the dongle 200 of FIG. 5 includes one BT module 240, and the NFC module 243 stores information used to pair the dongle 200 with a corresponding BT module and then transmits the stored information to the electronic device 100 according to the request. In manner similar to the dongle 200 described with reference to FIG. 3, the dongle 200 of FIG. 5 also includes the keyboard BT module 241 and the mouse device BT module 242, and the NFC 243 stores pairing information regarding the BT module 241 and the mouse device BT module 242 (e.g., MAC addresses and PIN numbers), and then transmits the stored information to the electronic device 100 according to the BT pairing information request.

The NFC module 243 may operate in a reader mode according to the manufacturing design of the dongle 200. The dongle 200 of FIG. 5 is designed in such a way that the NFC module 243 supports both a reader mode and a tag mode and is connected to the power supply. The dongle 200 of FIG. 5 may further include a button for creating a signal to operate the NFC module 243. When the user operates the button, the NFC module 243 in a reader mode tags the electronic device 100. When the user operates the button to request BT pairing information from the electronic device 100, the dongle 200 of FIG. 5 can establish a short-range RF communication channel with the electronic device 100.

The BT module 240 accesses signals stored in keyboard stack 231 and the mouse device stack 232, e.g., keyboard RF signal or mouse device RF signal converted as BT signal, and then transmits the converted signals to the electronic device 100 via the antenna 250. To this end, the BT module 240 further includes signal lines for reading data from the keyboard stack 231 and the mouse device stack 232. In addition, when the dongle 200 receives a request for establishing a short-range communication channel based on information stored in the NFC module 243 from the electronic device 100, the BT module 240 supports the operations to establish a communication channel without requesting additional information. When the NFC module 243 operates in a reader mode and acquires BT pairing information regarding the electronic device 100, the BT module 240 performs a control operation to establish a short-range RF communication channel with the electronic device 100 using corresponding BT pairing information.

Figure 6:
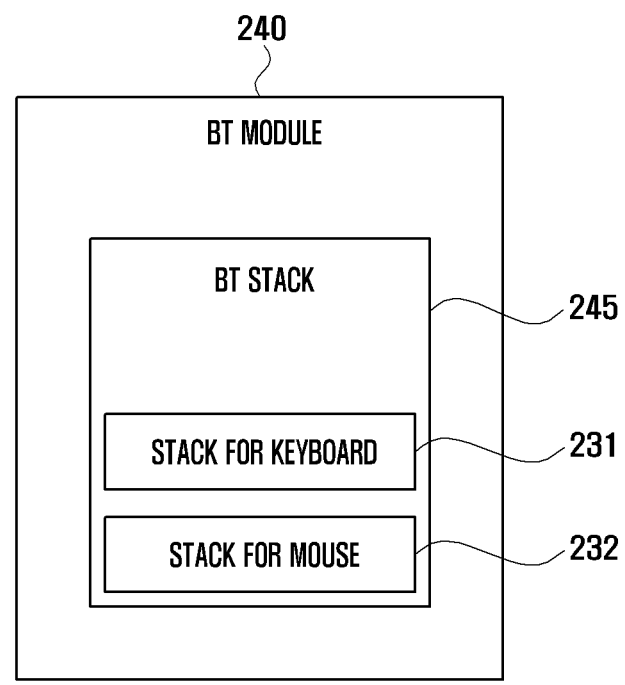
FIG. 6 is a schematic block diagram illustrating a BT module in a dongle according to an embodiment of the present invention.

Although the examples of the dongle 200 shown and described with reference to FIGS. 4 and 5 are implemented in such a way that the keyboard stack 231 and the mouse device stack 232 are arranged in areas adjacent to the BT module 240, embodiments of the present invention are not limited to these particular embodiments. For example, a dongle 200 according to embodiments of the present invention may be modified in such a way that the keyboard stack 231 and the mouse device stack 232 are arranged in areas in a BT stack 245 included in the BT module 240, such as shown in FIG. 6. In addition, when the dongle 200 according to embodiments of the present invention is manufactured, the keyboard stack 231 and the mouse device stack 232 are connected to the signal converter 230 and the BT module 240 via signal lines, and may be arranged in the BT module 240 and the signal converter 230, individually and respectively. The signal converter 230 writes data in the keyboard stack 231 and the mouse device stack 232. The BT module 240 reads data from the keyboard stack 231 and the mouse device stack 232. The stacks may be arranged adjacent to the signal converter 230, so that the signal converter 230 can directly read data therefrom without using additional signal lines.

Although the example of the dongle 200 shown and described with reference to FIG. 3 is implemented in such a way that the keyboard BT module 241 and the mouse device BT module 242 are separately configured, the keyboard BY module 241 and the mouse device BT module 242 may be integrated as one BT module in accordance with embodiments of the present invention. In that case, the signal converter 230 configures a packet corresponding to an RF signal converted to a BT signal, as the format shown in FIG. 7, i.e., the signal converter 230 forms a data packet 40 that includes an area 41 representing the mouse device RF signal, an area 42 describing the mouse device RF signal, an area 43 representing the keyboard RF signal, and an area 44 describing the keyboard RF signal.

Figure 8:
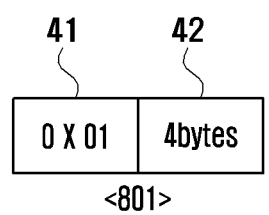
FIG. 8 is a diagram illustrating another example of a structure of a packet converted in the signal converter according to an embodiment of the present invention.
Figure 8:
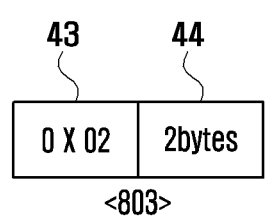

When dongles 200 according to embodiments of the present invention, such as shown in FIGS. 3 to 5, for example, are implemented in such a way that includes the keyboard BT module 241 and the mouse device BT module 242 separately or that includes the keyboard stack 231 and the mouse device stack 232, the signal converter 230 can create packets for distinguishing corresponding RF signals respectively, as shown in FIG. 8. When the signal converter 230 receives a wired USB keyboard signal via the keyboard USB interface 210, the signal converter 230 converts the signal to a keyboard RF signal and creates a keyboard packet, as shown in diagram 801 of FIG. 8, including an area 41 representing the keyboard RF signal, and an area 42 describing the keyboard RF signal. After that the keyboard packet is created, the signal converter 230 transfers the crated keyboard packet to the keyboard stack 231 or the keyboard BT module 241. Likewise, when the signal converter 230 receives a wired USB mouse device signal via the mouse device USB interface 220, the signal converter 230 converts the signal to a mouse device RF signal and creates a mouse device packet, as shown in diagram 803 of FIG. 8, including an area 43 representing the mouse device RF signal and an area 41 describing the mouse device RF signal. After that the mouse device packet is created, the signal converter 230 transfers the created mouse device packet to the mouse device stack 232 or the mouse device BT module 242.

Figure 7:
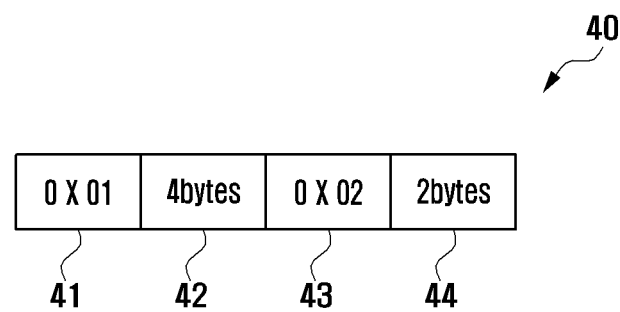
FIG. 7 is a diagram illustrating an example of a structure of a packet converted in the signal converter according to an embodiment of the present invention.

When the electronic device 100 receives the keyboard and mouse device packets, such as the packets illustrated in FIGS. 7 and 8, from the dongle 200, the electronic device 100 can detect an area representing the mouse device RF signal and an area representing the keyboard RF signal and then determine which signal from which the received packet was created. After determining the signal input via a corresponding external input device, the electronic device 100 detects an area describing a keyboard RF signal and an area describing a mouse device RF signal and then applies the signal described in the corresponding area to a user function. During this process, when one packet, as the packet 40 illustrated in FIG. 7, includes data related to both a mouse device and a keyboard, the electronic device 100 can read the entire area in the packet. Each packet shown in FIGS. 7 and 8 includes an area at the end that has a flag indicating whether the packet has been processed.

A method for operating an external input means via the dongle is according to an embodiment of the present invention is described as follows with reference to FIG. 9.

Figure 9:
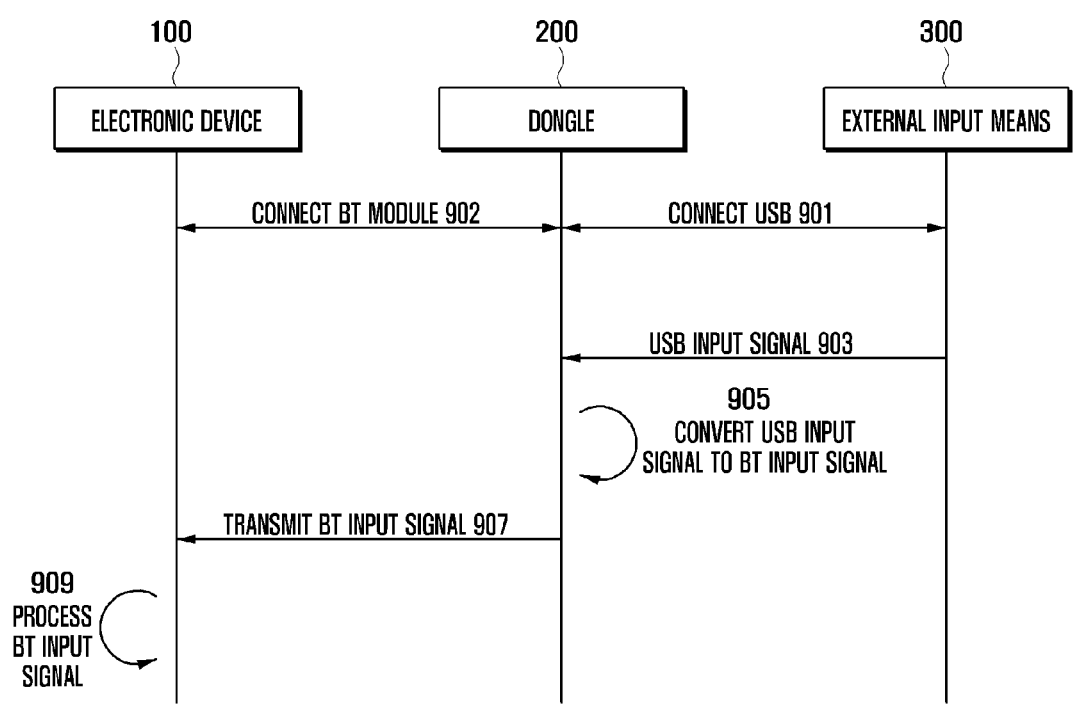
FIG. 9 is a signal flow chart illustrating a method for operating an external input means between components in an external input system, according to an embodiment of the present invention.

FIG. 9 is a signal flow chart illustrating a method for operating an external input means between components included in an external input system, according to an embodiment of the invention.

Referring to FIG. 9, an external input means 300 is connected to the USB interface of the dongle 200, thereby establishing USB communication connection in step 901, through a USB connector included the external input means 300. Therefore, the external input means 300 and the dongle 200 are connected to each other as the USB connector of the external input means 300 is inserted into the USB interface of the dongle 200 Examples of the external input means 300 are a keyboard 310 and a mouse device 320, such as described in detail herein above, for example.

When the dongle 200 is connected to the external input means 300 at step 901, the dongle 200 also establishes a short-range RF communication channel with the electronic device 100, e.g., BT communication connection, according to the user's request, at step 902. During this process, the electronic device 100 scans dongles and performs a BT pairing process with a corresponding dongle, i.e., 200. When the dongle 200 includes an NFC module 243, the electronic device 100 acquires BT module pairing information stored in the NFC module 243, e.g., MAC address and PIN number, and establishes a short-range RF communication channel with the dongle 200 based on the acquired pairing information. Although, in the present example according to an embodiment of the present invention, the dongle 200 first performs USB communication connection at step 901 and then BT communication connection at step 902, it should be understood that the embodiments of the present invention are not limited to this order of operations. For example, in accordance with other embodiments of the present invention, the BT communication connection may be performed before the USB communication connection is performed.

When the user performs an input operation via the external input means 300, the external input means 300 creates an input signal and then transfers the USB signal to the dongle 200 via the USB connector and the USB interface, in step 903.

When the dongle 200 receives the USB signal from the external input means 300, it converts the USB signal to a BT signal, in step 905. The dongle 200 can record data, indicating that the respective signals are transferred from the keyboard 310 and the mouse device 320, and data corresponding to the signals in the packet converted from an RF signal adapted to an RF communication module, e.g., a BT signal. Alternatively, while the dongle 200 is converting a USB signal transferred from the keyboard 310 to a BT signal, i.e., a keyboard RF signal, the dongle 200 can create a packet that includes data indicating that the signal is a keyboard RF signal and a keyboard RF signal corresponding to a particular key of the keyboard. In addition, while the dongle 200 converts a USB signal transferred from the mouse device 320 to a BT signal (i.e., a mouse device RF signal), the dongle 200 can create a packet that includes data indicating that the signal is a mouse device RF signal and a mouse device RF signal corresponding to the direction or click operation of the mouse device.

The dongle 200 transmits the converted packet to a BT signal to the electronic device 100, in step 907. The electronic device 100 applies the received BT signal to a currently activated user function, thereby processing the BT signal, in step 909.

As described above, the dongle and method for operating an external input means and an external input system with the dongle, according to the invention, can connect the external input means 300 that the user are familiar with and can easily handle to the dongle 200 and allow the user to operate the electronic device 100. Therefore, the user can easily perform various types of work (e.g., email or message writhing, painting, photograph edit, etc.), irrespective of the input unit of the electronic device 100.

As described above, the dongle and method for operating an external input means and an external input system with the dongle, according to embodiments of the present invention, allow users to easily operate electronic devices using input means that they are familiar with.

In addition, embodiments of the present invention also allow users to easily operate electronic devices by using various types of external input means, via a dongle.

Although not shown in the drawings, electronic devices according to embodiments of the present invention may selectively further include various other types of components, such as a camera module for acquiring photographs/video, an Internet communication module, and a digital broadcast module for receiving and reproducing broadcasts. With the spread of digital convergence, although electronic devices vary too greatly in order to list all possible modifications, other components equivalent to the above-listed components may also be included in electronic devices according to embodiments of the present invention. Also, it will be appreciated that, according to the embodiments of the present invention, the electronic device may be implemented by omitting a particular component, or by replacing a particular component with other components.

Although embodiments of the invention have been described in detail hereinabove, many variations and modifications of various embodiments of the present invention described herein, which may be apparent to those skilled in the art, will still fall within the spirit and scope of the present invention as defined in the appended claims.

What is claimed is:

1. A dongle for operating an external input means, the dongle comprising:
   a wired interface for connecting the dongle to an external input means, the external input means including at least one external input device;

a signal converter for converting a wired signal, which is transmitted from at least one external input device connected to the wired interface, into a Radio Frequency (RF) signal;

an RF communication module for transmitting the RF signal to an electronic device via an RF communication channel; and a Near Field Communication (NFC) module for storing Bluetooth pairing information corresponding to the RF communication module.

2. The dongle of claim 1, wherein:

the wired interface is a Universal Serial Bus (USB) interface; and the RF communication module is a Bluetooth module.

3. The dongle of claim 1, wherein the wired interface includes at least one of a keyboard wired interface for connecting the dongle to a keyboard, and a mouse device wired interface for connecting the dongle to a mouse device.

4. The dongle of claim 3, further comprising at least one of a keyboard stack for storing a keyboard RF signal converted from a wired signal input via the keyboard, and a mouse device stack for storing a mouse device RF signal converted from a wired signal input via the mouse device.

5. The dongle of claim 4, wherein at least one of the keyboard stack and the mouse device stack includes a signal line connected to the signal converter and a signal line connected to the RF communication module, and wherein at least one of the keyboard stack and the mouse device stack is installed in the RF communication module or in the dongle, separately from the signal converter and the RF communication module.

6. The dongle of claim 4, wherein the signal converter generates at least one of a packet that includes an area corresponding to the keyboard RF signal, an area including information that describes the keyboard RF signal, an area corresponding to the mouse device RF signal, and an area including information that describes the mouse device RF signal; a keyboard packet that includes an area corresponding to the keyboard RF signal and an area including information that describes the keyboard RF signal; and a mouse device packet that includes an area corresponding to the mouse device RF signal and an area including information that describes the mouse device RF signal.

7. The dongle of claim 3, wherein the RF communication module includes at least one of the following a keyboard RF communication module for converting a wired signal input via the keyboard into a keyboard RF signal and for transmitting the converted signal to the electronic device; and a mouse device RF communication module for converting a wired signal input via the mouse device into a mouse device RF signal and for transmitting the converted signal to the electronic device.

8. An external input system comprising:

an external input means, the external input means including at least one of a keyboard and a mouse device;

a dongle for converting a Universal Serial Bus (USB) wired signal, the wired signal being created via the external input means, into a Bluetooth signal, and for transmitting the converted via the Bluetooth module, the dongle including at least one USB interface connected to the external input means; and an electronic device for establishing a Bluetooth communication channel with the dongle and performing a function corresponding to the received BT signal, wherein the dongle includes a first Near Field Communication (NFC) module for storing Bluetooth pairing information corresponding to the Bluetooth module.

9. The external input system of claim 8, wherein the electronic device includes a second NFC module for reading pairing information from the first NFC module.

10. The external input system of claim 8, wherein the dongle further includes at least one of a keyboard stack, installed in the Bluetooth module, for storing a keyboard RF signal that is converted from a wired USB keyboard signal input via the keyboard; and a mouse device stack, installed in the Bluetooth module, for storing a mouse device RF signal converted from a wired USB mouse device signal input via the mouse device.

11. The external input system of claim 8, wherein the signal converter generates at least one of a packet that includes an area corresponding to the keyboard RF signal, an area describing the keyboard RF signal, an area representing the mouse device RF signal, and an area including information that describes the mouse device RF signal; a keyboard packet that includes an area corresponding to the keyboard RF signal and an area including information that describes the keyboard RF signal; and a mouse device packet that includes an area corresponding to the mouse device RF signal and an area including information that describes the mouse device RF signal.

12. A method for operating an external input means performed in an external input system, the method comprising:

establishing a wired connection between a dongle and the external input means;

establishing a wireless connection between the dongle and an electronic device;

transferring, by the wired connection, a wired signal created via the external input means, from the external input means to the dongle;

converting, by the dongle, the wired signal to a Radio Frequency (RF) signal;

wirelessly transmitting the RF signal from the dongle to the electronic device; and performing, by the electronic device, a function corresponding to the transmitted RF signal, wherein establishing the wireless connection comprises:

acquiring, by the electronic device, Bluetooth pairing information from an NFC module installed in the dongle; and establishing, by the electronic device, a Bluetooth communication channel with the dongle based on the Bluetooth pairing information.

13. The method of claim 12, wherein establishing the wired connection includes connecting the external input means to the dongle USB connection based on the USB protocol.

14. The method of claim 12, wherein establishing the wireless connection includes establishing a Bluetooth communication channel by performing Bluetooth pairing between the electronic device and the dongle.

15. The method of claim 12, wherein transferring, by the wired connection, the wired signal includes at least one of transferring, by the wired connection, a wired signal created via a keyboard to the dongle; and transferring, by the wired connection, a wired signal created via a mouse device to the dongle.

16. The method of claim 15, wherein converting the wired signal to the RF signal includes at least one of:

converting the wired keyboard signal to a keyboard RF signal, and creating a keyboard packet, where the keyboard packet includes an area corresponding to the keyboard RF signal and an area including information that describes the keyboard RF signal;

converting the wired mouse device signal to a mouse device RF signal, and creating a mouse device packet, where the mouse device packet includes an area corresponding to the mouse device RF signal and an area including information that describes the mouse device RF signal; and converting the wired keyboard signal to a keyboard RF signal and the wired mouse device signal to a mouse device RF signal, and creating a packet, where the packet includes an area representing the keyboard RF signal, an area describing the keyboard RF signal, an area corresponding to the mouse device RF signal, and an area including information that describes the mouse device RF signal.

17. The method of claim 16, further comprising at least one of:

storing the keyboard packet in a keyboard stack; and
storing the mouse device packet in a mouse device stack.

* * * * *